(12) United States Patent
Natsume

(10) Patent No.: US 7,266,581 B2
(45) Date of Patent: Sep. 4, 2007

(54) ARITHMETIC CIRCUIT

(75) Inventor: Kenichi Natsume, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 722 days.

(21) Appl. No.: 10/692,690

(22) Filed: Oct. 27, 2003

(65) Prior Publication Data

US 2004/0260742 A1 Dec. 23, 2004

(30) Foreign Application Priority Data

Jun. 23, 2003 (JP) ............................. 2003-177409

(51) Int. Cl.
*G06F 7/50* (2006.01)
(52) U.S. Cl. .................................................... 708/700
(58) Field of Classification Search ................. 708/700
See application file for complete search history.

(56) References Cited

U.S. PATENT DOCUMENTS 5,329,477 A * 7/1994 Kudou ........................ 708/706
5,375,079 A * 12/1994 Uramoto et al. ............ 708/709
5,511,017 A * 4/1996 Cohen et al. ................ 708/491
6,263,424 B1 * 7/2001 Tran et al. ................... 712/221
6,480,874 B1 * 11/2002 Aidan et al. ................ 708/700
6,925,480 B2 * 8/2005 Duborgel ..................... 708/523
6,989,843 B2 * 1/2006 Naegle et al. ............... 345/643

FOREIGN PATENT DOCUMENTS

JP 05-80978 4/1993
JP 2002-132492 5/2002

* cited by examiner

*Primary Examiner*—D. H. Malzahn
(74) *Attorney, Agent, or Firm*—Nixon Peabody LLP; Donald R. Studebaker

(57) ABSTRACT

There is provided an arithmetic circuit for minimizing the delay of data path from the input of data to be operated to the output of the result of operation of data. To that end, the arithmetic circuit comprises a first selector to which one input data and a fixed data are inputted wherein these data are selectively outputted in response to a control signal, a second selector to which another input data and an output data of a register are inputted wherein these data are selectively outputted in response to the control signal, an adder for receiving an output signal of the first selector and an output signal of the second selector to execute the addition of the output signals of the first and second selectors, and a register for receiving an output signal of the adder to hold the output signal in synchronization with a clock signal.

1 Claim, 8 Drawing Sheets

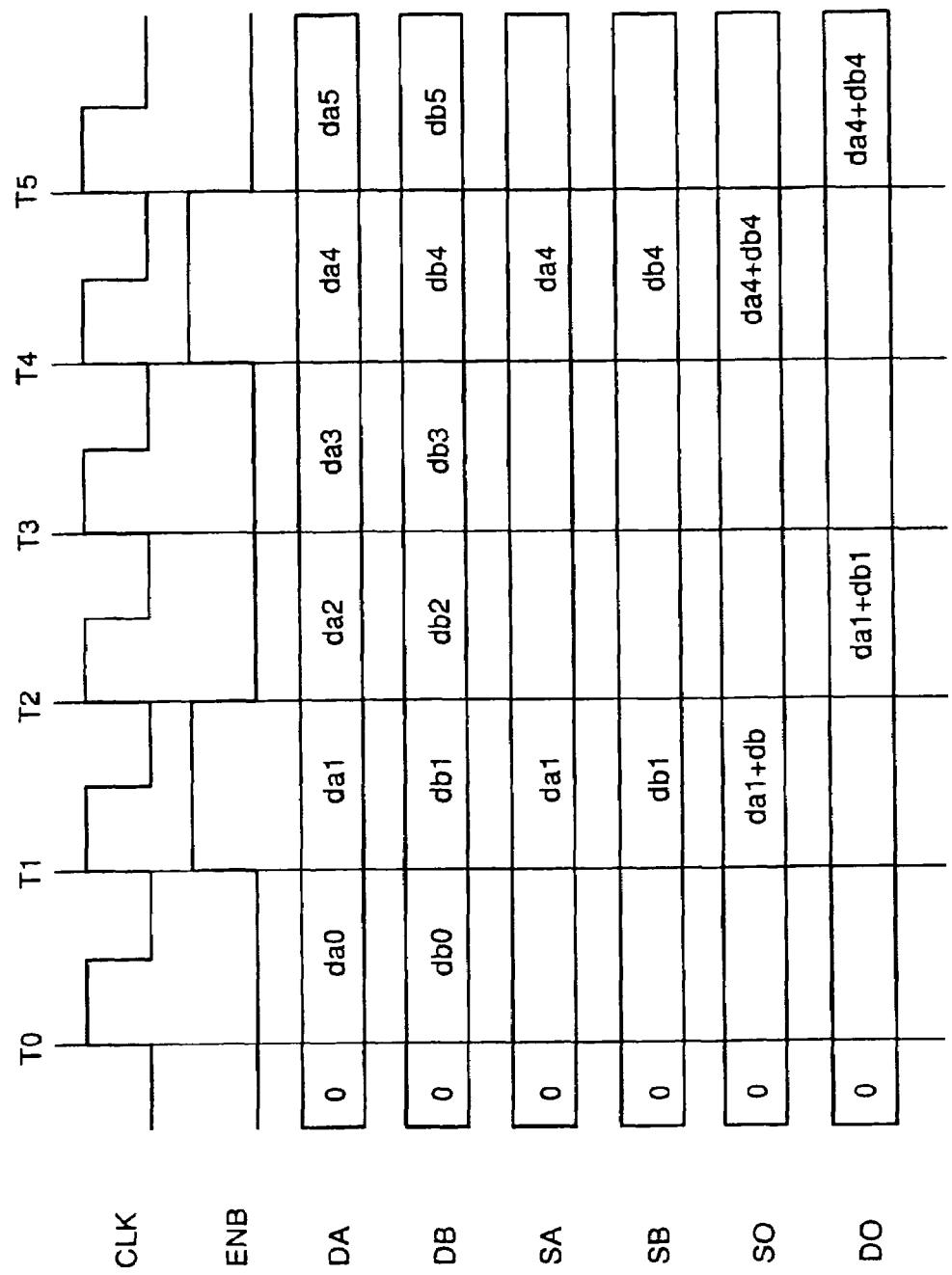

ARITHMETIC CIRCUIT

FIELD OF THE INVENTION

The invention relates to an arithmetic unit in a semiconductor integrated circuit and a peripheral circuit thereof.

BACKGROUND OF THE INVENTION

For a configuration of an arithmetic unit of a semiconductor integrated circuit and a peripheral circuit thereof, there has been a conventional arithmetic circuit having a circuit configuration as shown in FIG. 1. According to this arithmetic circuit, one input data DA of an adder 72 is inputted to one input terminal of an AND gate 71 while the other input data DB of the adder 72 is inputted to one input terminal of an AND gate 70. A signal ENB representing that operation data is valid is inputted to the other input terminals of the AND gates 70 and 71, wherein when the signal ENB is logical "H" level (valid), the input data DA, DB pass through the AND gates 70, 71 and they are inputted to the adder 72 while when the input data DA, DB are logical "L" level (invalid), input signals SA, SB of the adder 72 are rendered "L" level to allow the adder 72 inoperative, thereby enhancing low consumption of the arithmetic circuit (see timing chart of FIG. 2).

However, according to the conventional arithmetic circuit, gate circuits such as AND circuits and so forth are provided at the pre-stage of the arithmetic unit, a delay of data path from the input of data to the holding of the data in a register 74 becomes large, arising a problem to make it difficult to operate at high speed.

SUMMARY OF THE INVENTION

It is an object of the invention to provide an arithmetic circuit capable of minimizing the delay of data path from the input of data to be operated and the output of the result of operation. Accordingly, there is provided an arithmetic circuit comprising a first selector to which one input data DA and a fixed data "0" are inputted wherein these data are selectively outputted in response to a control signal ENB, a second selector to which another input data DB and an output data of a register are inputted wherein these data are selectively outputted in response to the control signal ENB, an adder for receiving an output signal SA of the first selector and an output signal SB of the second selector to execute the operation of SA+SB, and a register for receiving an output signal SO of the adder to hold the output signal SO in synchronization with a clock signal. With such a circuit configuration, it is possible to configure the circuit capable of reducing the number of stage of gates of the data path from the input of data to the holding of the data in the register, which facilitates high speed operation and also enhances low consumption.

Another configuration of an arithmetic circuit of the invention comprises a first selector to which one input data DA and a fixed data "−1" are inputted wherein these data are selectively outputted in response to a control signal ENB, a second selector to which another input data DB and an output data of a register are inputted wherein these data are selectively outputted in response to the control signal ENB, an inverter circuit for receiving the control signal ENB and outputting an inverted signal thereof, an adder for receiving an output signal SA of the first selector and an output signal SB of the second selector at its addition input terminals, and an output signal of the inverter circuit at its carry input terminal CI to execute the operation of SA+SB+CI, and a register for receiving an output signal SO of the adder to hold the output signal SO in synchronization with a clock signal. With such a circuit configuration, it is possible to configure the circuit capable of reducing the number of stage of gates of the data path from the input of the data to the holding of the data in the register, which facilitates high speed operation and also enhances low consumption.

Still another configuration of an arithmetic circuit of the invention comprises a first latch circuit for receiving one input data DA to allow one input data DA to pass therethrough when a control signal ENB is valid while holding one input data DA when the control signal ENB is invalid, a second latch circuit for receiving another input data DB to allow another input data DB to pass therethrough when the control signal ENB is valid while holding another input data DB when the control signal ENB is invalid, an adder for receiving an output signal SA of the first latch circuit and an output signal SB of the second latch circuit to execute an operation of SA+SB, and a register for receiving an output signal SO of the adder and holding the output signal SO in synchronization with a clock signal. With such a circuit configuration, it is possible to configure the circuit capable of reducing the number of stage of gates of the data path from the input of data to the holding of the data in the register, which facilitates high speed operation, and also since the data to be inputted to the adder is not changed even if the input data is changed when the write enable signal ENB is invalid, the internal state of the adder is not change, thereby further enhancing low consumption.

BRIEF DESCRIPTION OF THE DRAWINGS

FIG. 8 is a timing chart for explaining an operation of the arithmetic circuit shown in FIG. 7.

PREFERRED EMBODIMENT OF THE INVENTION

Preferred embodiments of the invention are described in detail hereinafter with reference to the accompanying drawings. Assume that depicted by "H" level of a signal and "L" level of the same correspond to a logical "1" and a logical "0".

First Embodiment

Figure 1:
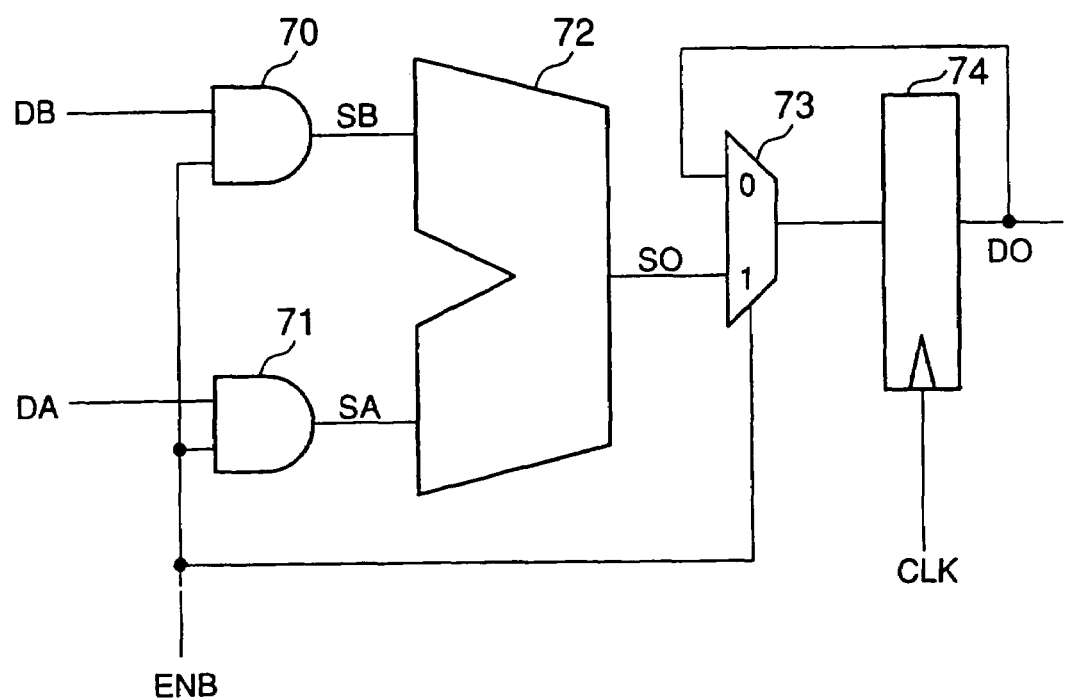
FIG. 1 is a circuit diagram showing a configuration of a conventional arithmetic circuit.
Figure 2:
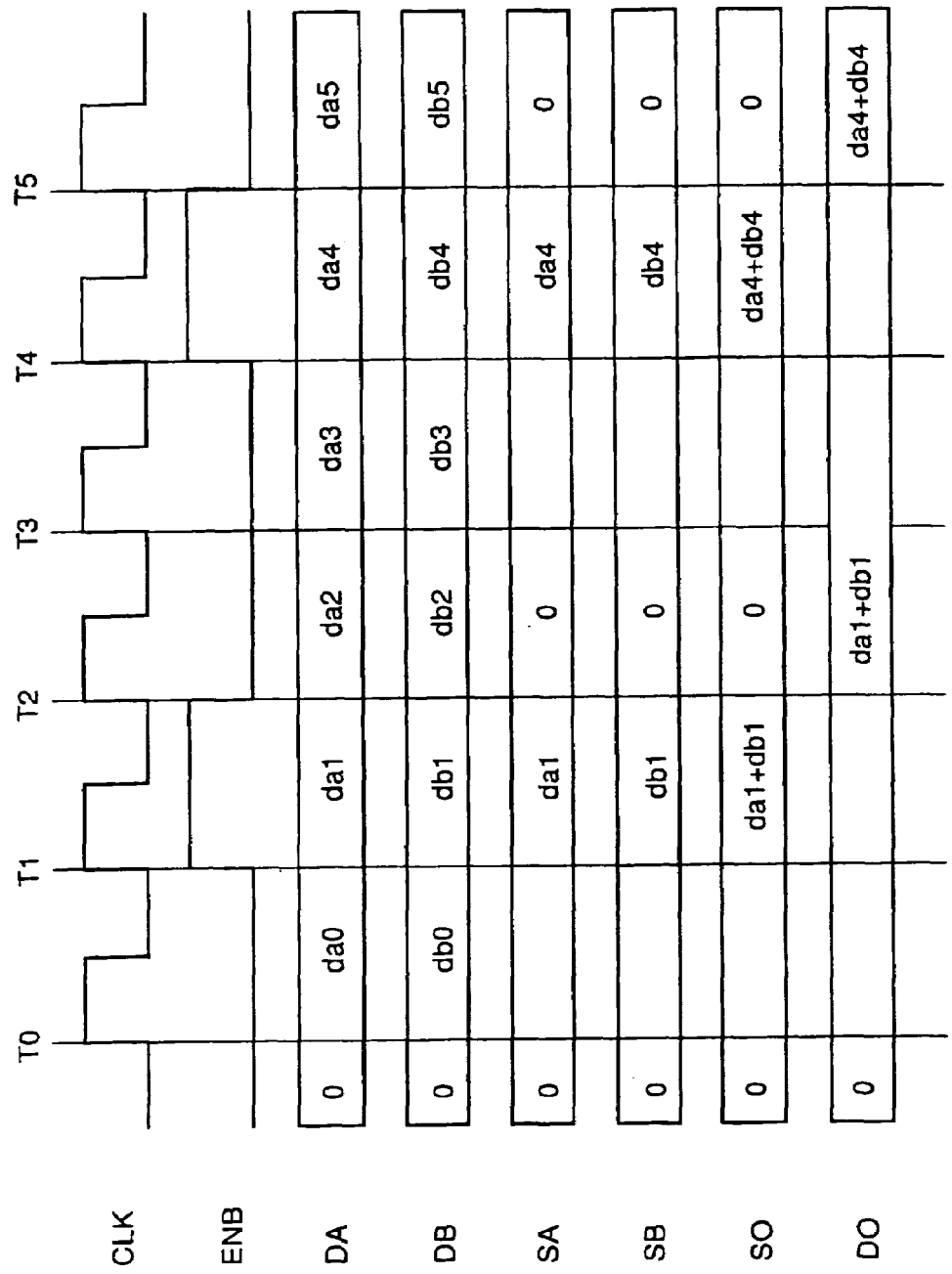
FIG. 2 is a timing chart for explaining an operation of the conventional arithmetic circuit.
Figure 3:
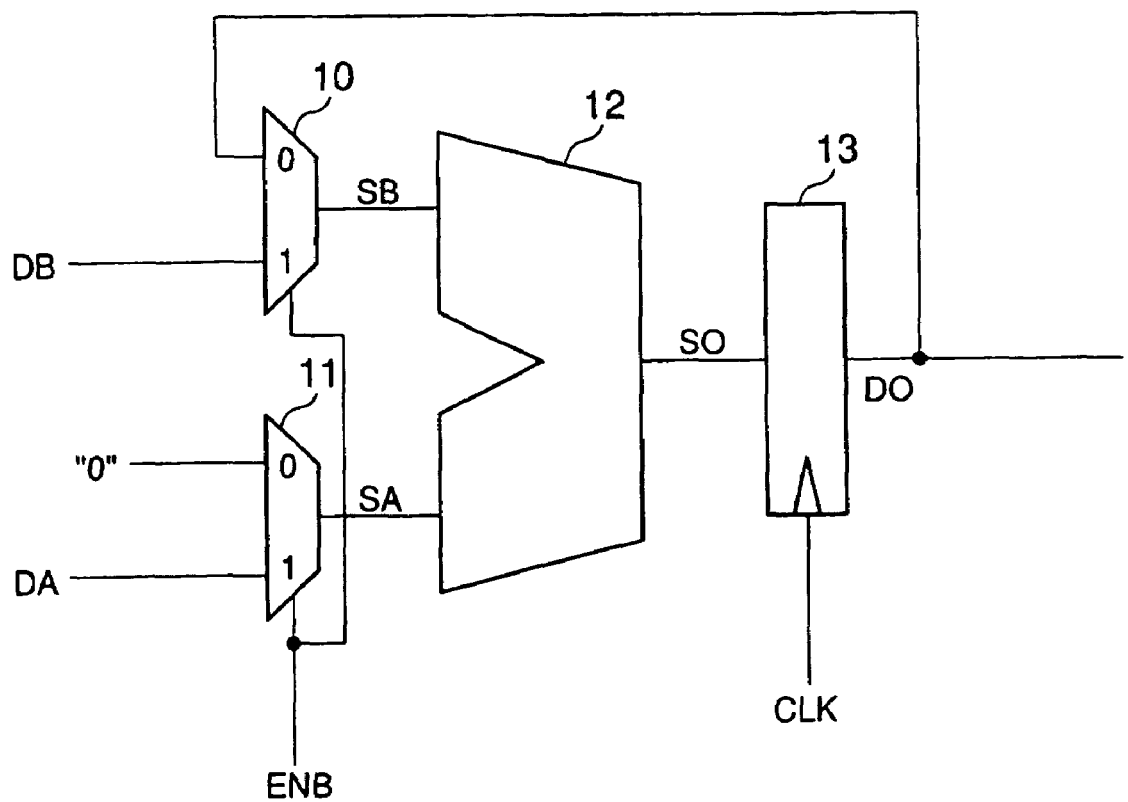
FIG. 3 is a circuit diagram showing a configuration of an arithmetic circuit according to a first embodiment of the invention.

FIG. 3 is a circuit diagram showing a configuration of an arithmetic circuit according to the first embodiment of the invention. One input data DA and data "0" are inputted to a selector 11, and another input data DB and output data DO of a register 13 are inputted to a selector 10. A write enable signal ENB is inputted to the selectors 10, 11 as a selection signal thereof.

An output signal SA of the selector 11 and an output signal SB of the selector 10 are inputted to an adder 12 as data to be added, and the result of addition SO is outputted from the adder 12. The result of addition SO is inputted to the register 13, and it is fetched into the register 13 at the leading edge of a clock signal CLK.

An operation of the arithmetic circuit is now described in detail.

Figure 4:
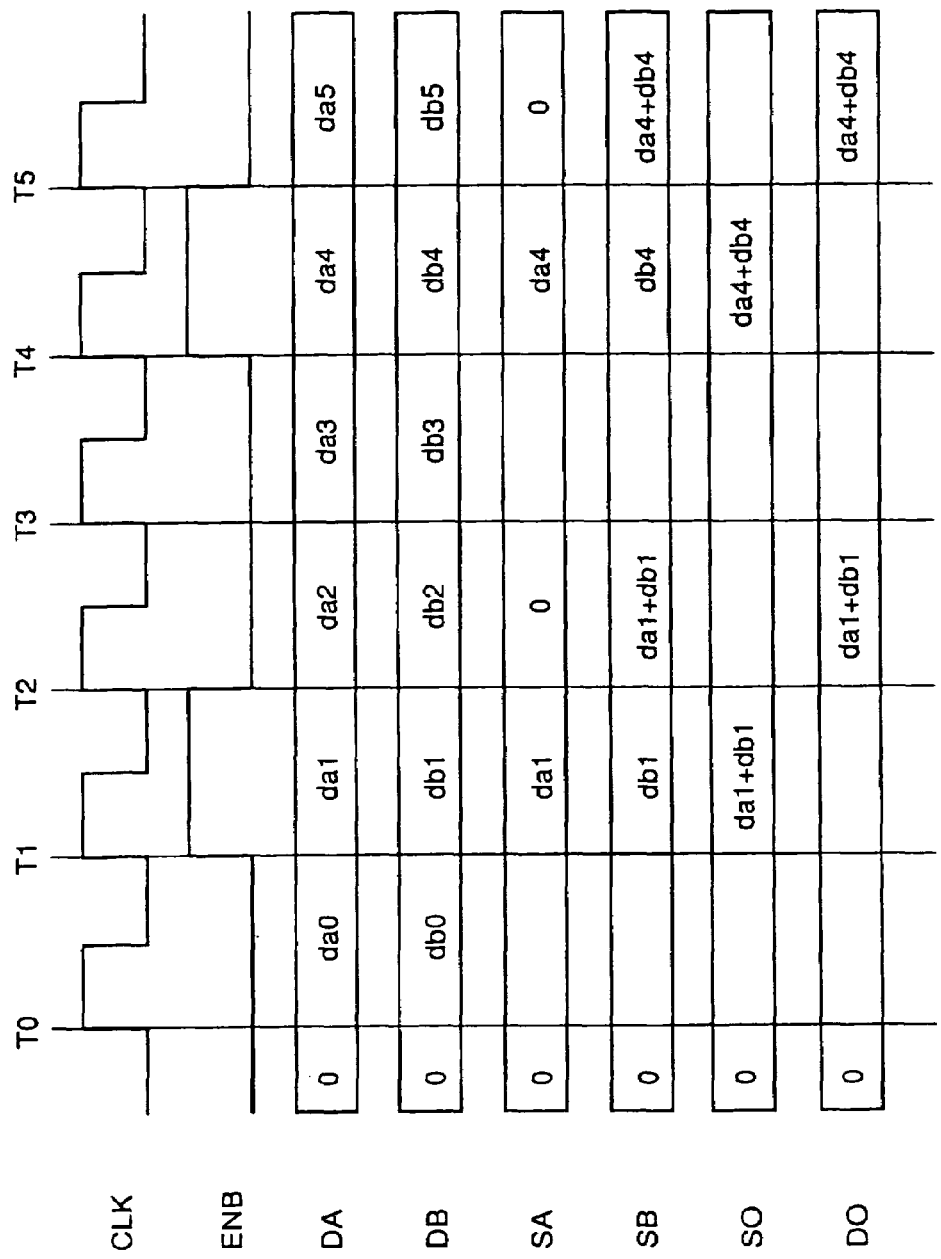
FIG. 4 is a timing chart for explaining an operation of the arithmetic circuit shown in FIG. 3.

FIG. 4 is a timing chart for explaining the operation of the arithmetic circuit shown in FIG. 3. Assume that, for brevity, before time T0, the data DA, DB and the register 13 are respectively initialized to a value "0" in response to a reset signal, not shown.

At time T0, although the data DA, DB become da0, db0, the selectors 10, 11 select "0" and the data DO which are respectively signals at the selection value "0" side since the write enable signal ENB remains "L" level, and since the output data DO is initialized to be "O" so that the expression SA=SB="0" is established. Accordingly, the output SO of the adder 12 at this time becomes "0".

At time T1, data DA, DB are changed to da1, db1, and the write enable signal ENB is changed to "H" level (valid). At this time, since the selectors 10, 11 select data DB, DA, the expressions SA=SA=da1, SB=DB=db1 are established, and the output SO of the adder 12 is expressed by SO=da1+db1.

At time T2, the register 13 latches the result of addition expressed by SO=da1+db1 at the leading edge of the clock signal CLK. Since the data DA, DB are changed to da2, db2 and the write enable signal ENB is changed to "L" level at time T2, the output signal SA of the selector 11 becomes a value "0" while the output signal SB of the selector 10 becomes the output data of the register 13 expressed by DO=da1+db1. Accordingly, the output SO of the adder 12 is expressed by SO=da1+db1, and it is not changed relative to the state thereof at time T1.

At time T3, since the value of the output signal SO of the adder 12 is expressed by SO=da1+db1 although the register 13 latches the output signal SO at the leading edge of the clock signal CLK, a value preceding this value is held. Since the write enable signal ENB remains "L" level although the data DA, DB are changed to da3, db3 at this time, the input signals SA, SB of the adder 12 and the output signal SO thereof are not changed in the same manner as the case at time T2.

At time T4, since the data DA, DB are changed to da4, db4 and the write enable signal ENB is changed to "H" level, the selector 11 selects the data DA and the selector 10 selects the data DB. As a result, the input signals SA, SB of the adder 12 are expressed by SA=da4 and SB=db4, and the output signal SO thereof is expressed by SO=da4+db4.

At time T5, the register 13 latches the result of operation expressed by SO=da4+db4 at the leading edge of the clock signal CLK. At this time, since the input data DA, DB are changed to da5, db5 and the write enable signal ENB is changed to "L" level, the selector 11 selects the value "0" and the selector 10 selects the output signal of the register 13 expressed by DO=da4+db4 and the expressions SA="0" and SB=da4+db4 are established. Accordingly, the output signal of the adder 12 is expressed by SO=da4+db4.

In the first embodiment, it is possible to configure the circuit capable of reducing the number of stage of gates of the data path from the input of the data to the holding of the data in the register, which facilitates high speed operation and also enhances low consumption.

Second Embodiment

Figure 5:
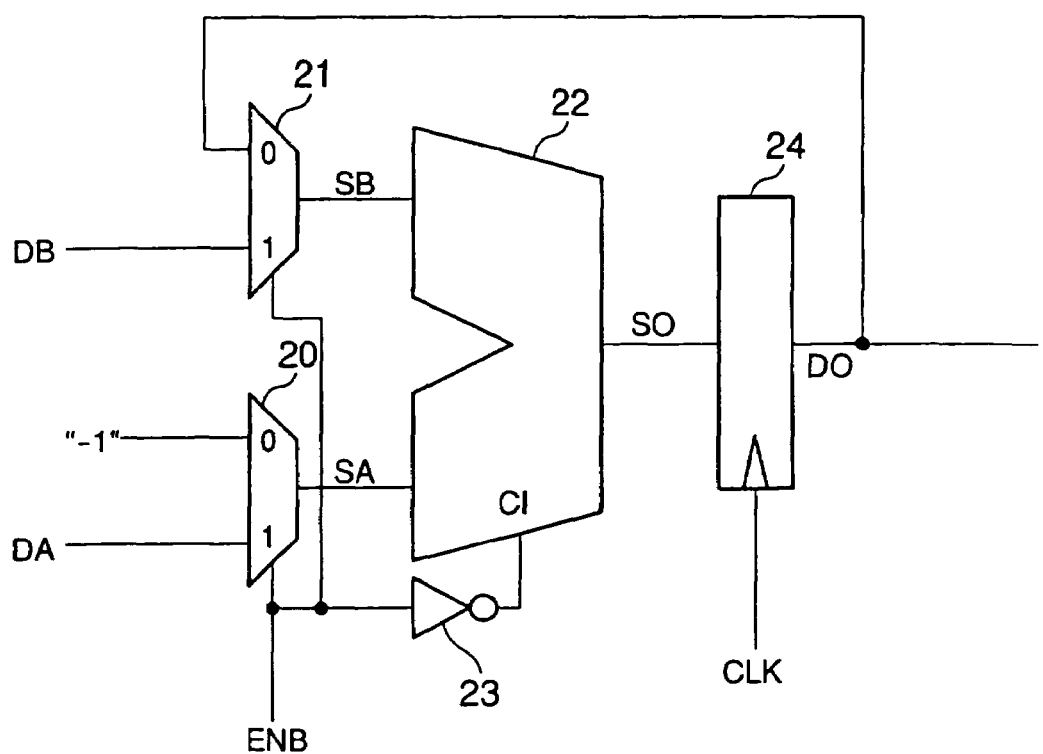
FIG. 5 is a circuit diagram showing a configuration of an arithmetic circuit according to a second embodiment of the invention.

FIG. 5 is a circuit diagram showing a configuration of an arithmetic circuit according to the second embodiment of the invention. One input data DA and data "−1" are inputted to a selector 20, and another input data DB and an output data DO of a register 24 are inputted to a selector 21. A write enable signal ENB is inputted to the selectors 20, 21 as a selection signal thereof.

The write enable signal ENB is also inputted to an inverter circuit 23 and output signal thereof is inputted to a carry input terminal CI of an adder 22.

An output signal SA of the selector 20 and an output signal SB of the selector 21 are inputted to the adder 22 as its data input terminals and the result of addition SO is outputted from the adder 22. The result of addition SO is inputted to the register 24 and it is fetched into the register 24 at the leading edge of the clock signal CLK.

The carry input terminal CI is a terminal for inputting a carry at the 0 bit-th of the adder 22, and the adder 22 in the second embodiment executes an operation of SO=SA+SB+CI, and the result of operation is fetched into the register 24.

An operation of the arithmetic circuit according to the second embodiment is now described.

Figure 6:
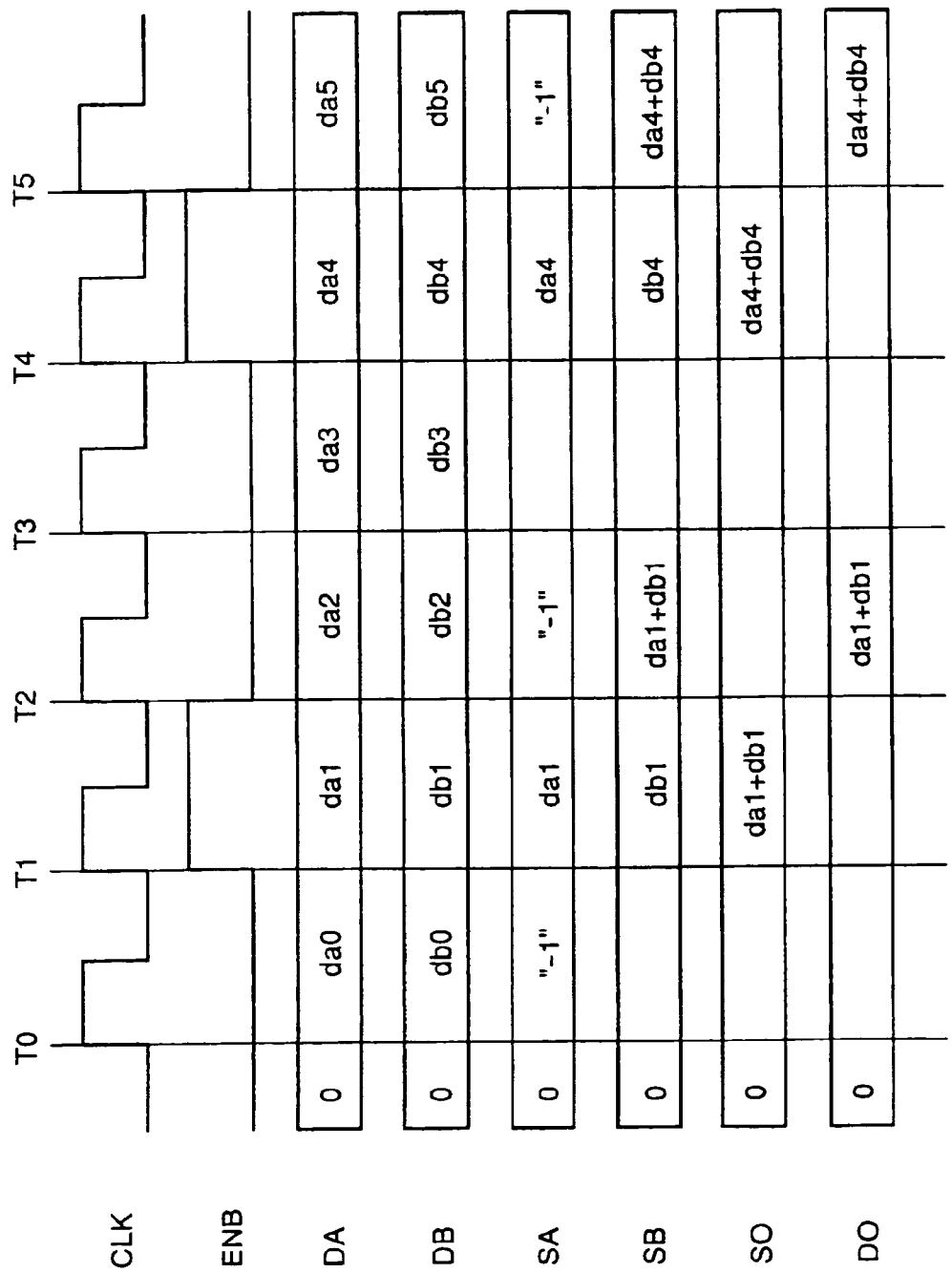
FIG. 6 is a timing chart for explaining an operation of the arithmetic circuit shown in FIG. 5.

FIG. 6 is a timing chart for explaining the operation of the arithmetic circuit shown in FIG. 5. Assume that, for brevity, before time T0, one input data DA, another input data DB and the register 24 are respectively initialized to a value "0" in response to a reset signal, not shown.

At time T0, although the data DA, DB become da0, db0, the selectors 20, 21 select "−1" and the data DO at the selection value "0" side since the write enable signal ENB remains "L" level, and the data DO is initialized to be "0" so that the expressions SA="1" and SB="0" are established. Meanwhile, the output of the inverter 23 is changed to "H" level, the adder 22 executes an operation expressed by SA+SB+CI=0−1+1. Accordingly, the output SO of the adder 22 at this time becomes "0".

At time T1, the register 24 latches the result of operation expressed by SO=0 at the leading edge of the clock signal CLK. At this time, the input data DA, DB are changed to da1, db1 and the write enable signal ENB is changed to "H" level (valid). Since the selectors 20, 21 select the data DA, DB at this time, the expressions SA=DA=da1 and SB=DB=db1 are established and the carry inputted to the carry input terminal CI is expressed by CI=0, and hence the output SO of the adder 22 is expressed by SO=da1+db1.

At time T2, the register 24 latches the result of addition expressed by SO=da1+db1 at the leading edge of the clock signal CLK. Since the data DA, DB are changed to da2, db2 and the write enable signal ENB is changed to "L" level at time T2, the output signal SA of the selector 20 becomes a value "−1" while the output signal SB of the selector 21 becomes output data DO of the register 13 expressed by DO=da1+db1. Further, a logical value "1" corresponding to "H" level is inputted to the carry input terminal CI. Accordingly, the adder 22 executes an operation of da1+db1−1+1 and the output SO thereof is expressed by SO=da1+db1.

At time T3, since the value of the output signal SO of the adder 22 is expressed by SO=da1+db1 although the output signal SO is latched at the leading edge of the clock signal CLK, the value of the register 24 is not changed. Since the write enable signal ENB remains "L" level although the data DA, DB are changed to da3, db3 at this time, the input signals SA, SB of the adder 12 and the output signal SO thereof are not changed in the same manner as the case at time T2, and the expression SO=da1+db1 is established.

At time T4, the output signal SO is latched at the leading edge of the clock signal CLK and the contents of the register 24 are not changed. Since the input data DA, DB are changed to da4, db4, and the write enable signal ENB is changed to "H" level at this time, the selector 20 selects the data DA and the selector 21 selects the data DB. Further, the carry inputted to the input carry input terminal CI becomes a logical value "0" corresponding to "L" level. As a result, the input signals of the adder 22 are expressed by SA=da4, SB=db4, and CI=0, and the output SO thereof is expressed by SO=da4+db4.

At time T5, the register 24 latches the result of operation expressed by SO=da4+db4 at the leading edge of the clock signal CLK. Since the input data DA, DB are changed to da5, db5 and the write enable signal ENB is changed to "L" level at this time, the selector 20 selects the value "−1" and the selector 21 selects the output signal DO of the register 24 expressed by DO=da4+db4 and the expressions SA="−1" and SB=da4+db4 are established. Meanwhile, the logical value of the carry signal inputted to the carry input terminal CI becomes "1". Accordingly, the adder 22 executes an addition of −1+da4+db4+1 and the output signal SO thereof is expressed by SO=da4+db4.

Even in the second embodiment, since the number of stage of gates of the data path from the input of the data to the holding of the data in the register can be reduced in the same manner as the first embodiment, high speed operation is facilitated and also low consumption can be enhanced.

Third Embodiment

Figure 7:
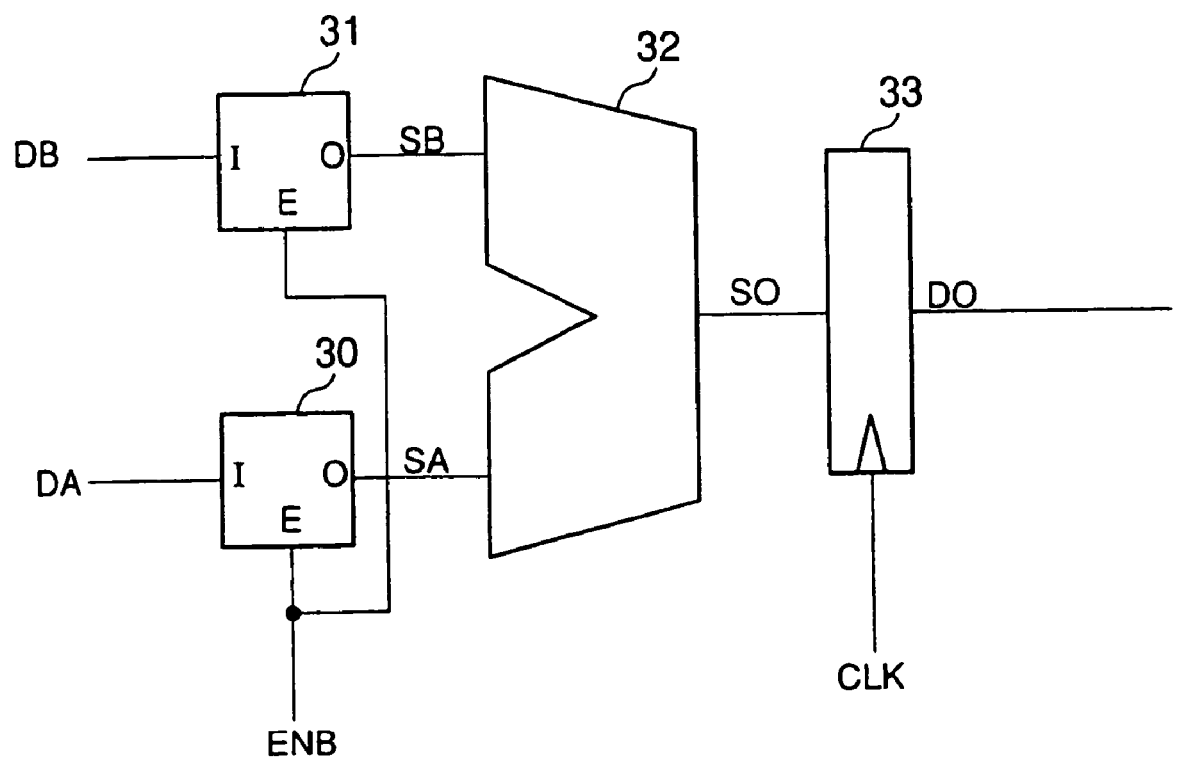
FIG. 7 is a circuit diagram showing a configuration of an arithmetic circuit according to a third embodiment of the invention.

FIG. 7 is a circuit diagram showing a configuration of an arithmetic circuit according to the third embodiment of the invention.

One input data DA is inputted to an input terminal I of a latch circuit 30, while a write enable signal ENB is inputted to an enable input terminal E thereof. Likewise, another input data DB is inputted to an input terminal I of a latch circuit 31, while the write enable signal ENB is inputted to an enable input terminal E thereof. Depicted by ENB is a write enable signal of a register 33, wherein data can be written when the write enable signal ENB is "H" level, and cannot be written (value is held) when the write enable signal ENB is "L" level. Since the write enable signal ENB is also inputted to the latch circuits 30, 31, and the latch circuits 30, 31 allow the input data to pass therethrough (0=1) when the write enable signal ENB is "H" level and latches the data when the write enable signal ENB is "L" level.

The output signals SA, SB from the latch circuits 30, 31 are inputted to the addition input terminals of an adder 32, and the result of addition of the output signals SA, SB is outputted from the adder 32 as an output signal SO, which is in turn inputted to the register 33.

An operation of the arithmetic circuit is now described in detail.

FIG. 8 is a timing chart for explaining the operation of the arithmetic circuit shown in FIG. 7. Assume that, for brevity, before time T0, the data DA, DB, the register 24 and the latch circuits 30, 31 are respectively initialized to a value "0" in response to a reset signal, not shown.

At time T0, since the write enable signal ENB remains "L" level although the data DA, DB are changed to da0, db0, the latch circuits 30, 31 output the initialized value "0" and the expression SA=SB="0" is established. The output SO of the adder 32 at this time is expressed by SO="0".

At time T1, the register 33 latches the result of addition SO at the leading edge of the clock signal CLK. The input data DA, DB are changed to da1, db1 and the write enable signal ENB is changed to "H" level (valid). The latch circuits 30, 31 output the data DA, DB as they are at this time. Accordingly, the expressions SA=DA=da1 and SB=DB=db1 are established, and hence the output SO of the adder 32 is expressed by SO=da1+db1.

At time T2, the register 33 latches the result of addition SO expressed by SO=da1+db1 at the leading edge of the clock signal CLK Since the input data DA, DB are changed to da2, db2 and the write enable signal ENB is changed to "L" level at time T2, the outputs of the latch circuits 30, 31 maintain the latched data which are expressed by SA=da1, SB=db1. Since the input state of the adder is not changed even if the write enable signal ENB is changed to "L" level, the internal state of the adder is not changed, thereby reducing low consumption by that amount.

At time T3, although the register 33 latches the value of the output signal of the adder 32 at the leading edge of the clock signal CLK, this value is expressed by SO=da1+db1, and hence the value held by the register 33 is not changed. Since the write enable signal ENB remains "L" level although the input data DA, DB are changed to da3, db3 at this time, the input signals SA, SB and the output signal SO of the adder 12 are not changed, and hence the expression SO=da1+db1 is established in the same manner at time T2.

At time T4, the register 33 latches the output signal SO at the leading edge of the clock signal CLK, and the contents of the register 33 are not changed. Since the input data DA, DB are changed to da4, db4 and the write enable signal ENB is changed to "H" level at time T4, the latch circuits 30, 31 output outputs DA, DB expressed by DA=da4 and DB=db4. Since the inputs of the adder 32 are expressed by SA=da4 and SB=db4, the output thereof is expressed by SO=da4+db4.

At time T5, the register 33 latches the result of operation expressed by SO=da4+db4 at the leading edge of the clock signal CLK. Since the data DA, DB are changed to da5, db5 and the write enable signal ENB is changed to "L" level at this time, the output signal SA, SB of the latch circuits 30, 31 are not changed while maintaining the previous state. Accordingly, the input SO of the adder 32 is not changed, and it is expressed by SO=da4+db4.

Even in the third embodiment, the number of stage of gates of the data path from the input of the data to the holding of the data in the register can be reduced in the same manner as the first and second embodiments, high speed operation is facilitated and also in the third embodiment even if the data DA, DB are changed when the write enable signal ENB is changed to "L" level, the data to be inputted to the adder are not changed, and hence the internal state of the adder is not changed. Accordingly, low consumption can be more enhanced.

The invention is not limited to the first to third embodiments as set forth above, but it can be changed variously based on the gist of the invention. For example, in the first embodiment, if the input signal "0" to be inputted to the selector 11 is replaced by an input "1", the adder 12 can be switched from a multiplier to a multiplier circuit. Further, in the third embodiment, if the adder 32 is replaced by a multiplier, a multiplier circuit can be formed by the circuit configuration thereof as it is.

What is claimed is:

1. An arithmetic circuit comprising:

a first selector to which one input data and a fixed data are inputted wherein these data are selectively outputted in response to a control signal;

a second selector to which another input data and an output data of a register are inputted wherein these data are selectively outputted in response to the control signal;

an inverter circuit for receiving the control signal and outputting an inverted signal thereof;

an adder for receiving an output signal of the first selector and an output signal of the second selector at its addition input terminals, and an output signal of the inverter circuit at its carry input terminal to execute an addition of the output signals of the first and second selectors and the output signal of the inverter circuit; and a register for receiving an output signal of the adder to hold the output signal in synchronization with a clock signal.

* * * * *